United States Patent [19]

Ioanesian et al.

[11] 3,944,303
[45] Mar. 16, 1976

[54] THRUST SUPPORT FOR A FLUID MOTOR USED IN DRILLING WELLS

[76] Inventors: Jury Rolenovich Ioanesian, Matveevskaya ulitsa, 18, korpus 2, kv. 63; Boris Vladimirovich Kuzin, Bulatnikovsky proezd, 10, korpus 3, kv. 499, both of Moscow, U.S.S.R.

[22] Filed: June 3, 1975

[21] Appl. No.: 583,450

[52] U.S. Cl. ................................................ 308/6 A
[51] Int. Cl.² F16C 17/00; F16C 19/00; F16C 21/00; F16C 29/00
[58] Field of Search .................... 308/4 A, 6 A, 139; 175/321

[56] References Cited
UNITED STATES PATENTS
1,651,088  11/1927  Fentress ............................. 308/6 A
3,884,051  5/1975  Bottoms .............................. 308/6 A

*Primary Examiner*—Lloyd L. King
*Attorney, Agent, or Firm*—Lackenbach, Lilling & Siegel

[57] ABSTRACT

The thrust support incorporates a rolling-contact thrust bearing with the inner and outer races rigidly attached to the shaft and housing of the fluid motor, respectively. Interposed between said races are balls. Positioned near the end faces of the thrust bearing are multi-row mechanical seals in the form of inner and outer friction discs which make up friction packs and are rigidly attached to the inner and outer races of the thrust bearing, respectively, and are rigidly attachable to the shaft and housing of the motor, respectively.

1 Claim, 2 Drawing Figures

THRUST SUPPORT FOR A FLUID MOTOR USED IN DRILLING WELLS

The present invention relates to thrust supports for fluid motors used in drilling deep oil and gas wells by means of both rock bits and diamond bits. The thrust support disclosed can be used most effectively in conjunction with fluid motors and jet bits operating under the conditions of high differential pressure of the mud (of the order between 80 and 100 atm.).

Known in the art is a thrust support for a turbodrill used in drilling wells, said support being disposed in the drill housing. The known thrust support incorporates a multirow rolling-contact thrust bearing with rotatable inner and static outer races. Positioned near the thrust bearing at its top end face is a mechanical seal with a static disc rigidly attached to the housing of the turbodrill along with a pack of outer races of the bearing and a rotatable disc fitted on the shaft of the turbodrill with provision for axial displacement relative to the shaft, said rotatable disc abutting against the static disc due to the action of the hydraulic load.

When use is made of mud having many abrasive particles and of bits operating under a low differential pressure, said pressure controlling the magnitude of the hydraulic force which causes the rotable disc of the seal to abut against the static disc, the annular clearance existing between the rotatable disc and the cylindrical surface over which the disc travels in the axial direction is blocked with solid particles of the mud. This interferes with the axial travel of the rotatable disc and prevents the disc from being pressed against its static counterpart under the hydraulic load with the result that abrasive particles easily enter inside the thrust bearing, causing its rapid wear and failure of the thrust support of the turbodrill.

If the known thrust support is used in a well-sinking motor employing jet bits which operate under a high differential pressure, the force pressing the rotary disc of the mechanical seal against the static disc is so great that there is no mechanical seal capable of withstanding it. The recourse to a plurality of mechanical seals fitted in succession also fails in this case to give adequate protection against the ingress of abrasive particles into the bearing, for only the foremost seal is exposed to the total differential pressure whereas each of the rest of the seals are going to perform each its function only on the failure of the foremost seal.

It is an object of the present invention to provide a thrust support for a fluid motor used in drilling wells which will have an extended service life and will extend the period during which the fluid motor can be run continuously.

Another object of the present invention is to provide a thrust support for a fluid motor used in drilling wells which will enable the use of the motor in conjunction with jet drills.

These and other objects are attained by a thrust support for a fluid motor used in drilling wells which is disposed in the housing of the motor and incorporates a rolling-contact thrust bearing containing rolling-contact bodies interposed between races attached to the shaft and races attached to the housing, some of them being rotatable, and which further incorporates a mechanical seal positioned near the thrust bearing at least at the top end face and containing at least one friction pack made up of two discs, one of them being rigidly attached to the static races of said bearing and the other being rotatably attached thereto.

According to the invention, the rotatable disc of the mechanical seal is rigidly connected to the rotatable races of the thrust bearing.

By virtue of the present invention there is provided a support which gives extra long service life and extends by a considerable amount the period during which the fluid motor can be run continuously in drilling wells; the support provided also assures successful running of said fluid motor in conjunction with jet bits.

The present invention will be best understood from the following description of a preferred embodiment of the invention when this description is being read in conjunction with the accompanying drawings in which:

FIGS. 1 and 2 show the way the thrust support is used in accordance with the present invention in a turbodrill.

Figure 1:
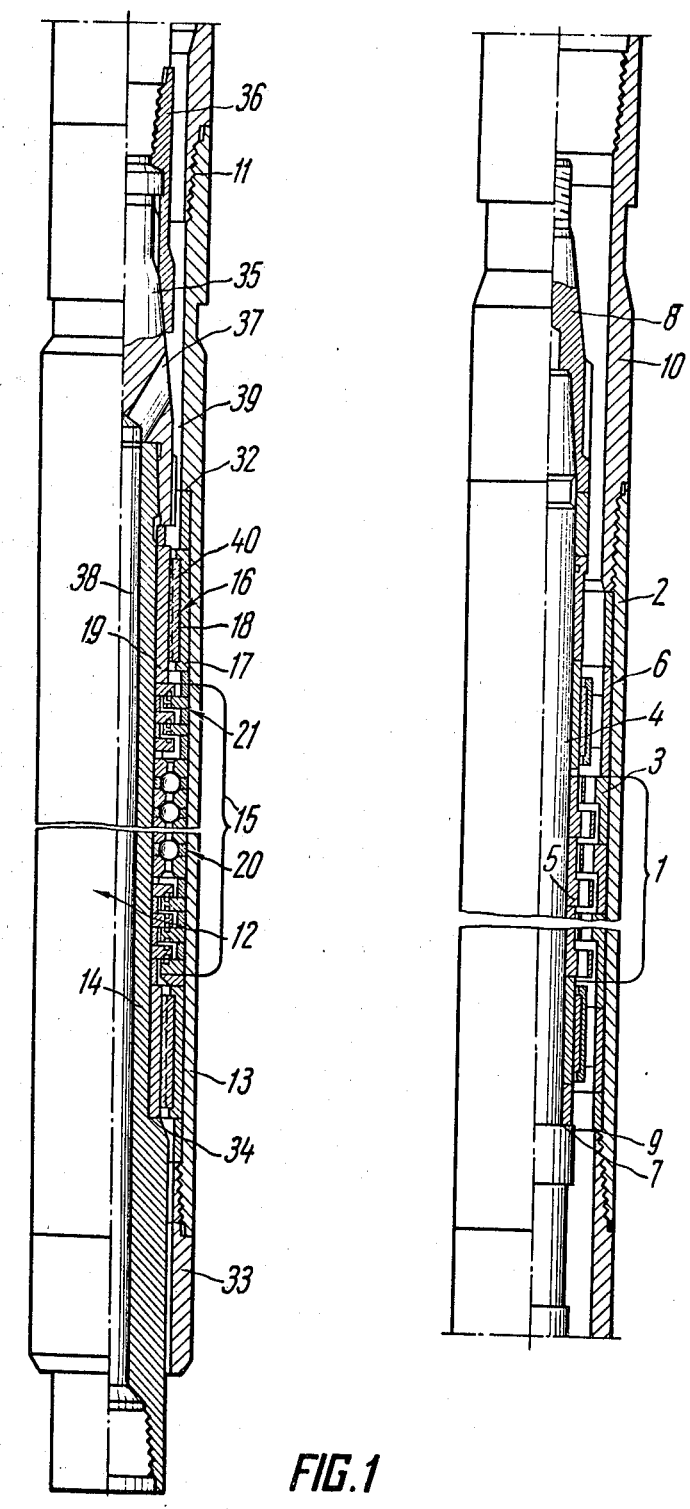
FIG. 1 is a sectional elevation of a turbodrill incorporating the thrust support in accordance with the invention.

Disposed at the top of the turbodrill is a turbine 1 consisting of several stages. Each of the stages consists of a stator 3 secured in housing 2 of the turbine so that its blades form passages directing the flow of mud and of a rotor 5 secured to a shaft 4 of the turbodrill so that its blades are pointed in a direction opposite to that of the blades of the stator 3 and consequently change the direction of mud flow with the result that the rotor 5 is set relatively to the stator 3, creating thereby the single-stage torque.

Positioned near the turbine at both end faces are radial supports 6 each of which is a plain radial bearing with a metal backed rubber insert. Passages (not shown) provided in the bearing housings serve to admit mud into, and discharge mud from, the turbine.

The torque produced by all the rotors is transmitted to the shaft by pressing the rotors against an end face 7 of the shaft, this being accomplished by screwing a nut 8 onto the shaft. The torque reaction of all the stators is transmitted to the turbine housing by pressing the stators against an end face 9 of the shaft, this being accomplished by screwing an adapter 10 onto the housing 2.

Attached by means of a threading 11 to the housing 2 of the turbine at the lower end thereof is a spindle 12 having a housing 13 wherein disposed on a shaft 14 is a thrust support 15 having radial supports 16 positioned near it at both end faces thereof.

Each radial support 16 consists of an outer sleeve 17 having an insert 18 made of an antifriction material (for example, rubber) attached to its inside and of an inner sleeve 19 rotatably mounted in the insert 18 when the turbodrill is in operation.

The thrust support 15 incorporates a multi-row thrust ball bearing 20 having a multi-row mechanical seal 21 positioned at each of the end faces thereof.

The multi-row thrust ball bearing 20 contains balls 22 which are interposed between inner races 23 and outer races 24 separated by inner spacer rings 25 and outer spacer rings 26, respectively.

Each multi-row mechanical seal 21 is made up of several friction packs 27 each comprising an inner disc 28 fitted on the shaft 14 and an outer disc 29 also fitted on the shaft but so as to be contiguous with the inside surface of the spindle housing 13. The inner and outer discs of the friction packs are separated one from the other by inner spacer rings 30 and outer spacer rings 31, respectively. The rubbing surfaces of the inner discs 28 and those of the outer discs 29 are reinforced with antifriction inserts 28a and 29a which can be made of a hard alloy and are intended to prolong the service life of the discs comprising the mechanical seal.

The outer races 24 of the ball bearing along with the outer spacer rings 26 interposed therebetween and also the outer discs 29 of the mechanical seal along with the spacer rings 31 interposed therebetween are linked up one with another and with the housing by being pressed against an end face 32 of the housing 13 with the aid of a nipple 33 screwed down into the housing 13.

The inner races 23 of the ball bearing along with the inner spacer rings 25 interposed therebetween and also the inner discs 28 of the mechanical seal along with the inner spacer rings 30 interposed therebetween and linked up one with another and with the shaft 14 by being pressed against an end face 34 of the shaft 14 with the aid of a threaded sleeve 35 screwed on the shaft 14.

When the turbodrill is set into operation, the mud delivered by the mud pumps enters the turbine 1 which applies to the shaft 4 a torque transmitted to the shaft 14 with the bit (not shown) threadedly attached to its end through a tapered splined sleeve 36 engaging the threaded sleeve 35.

The outflow of mud from the turbine is admitted into the housing 13 where it is separated into two streams. The bulk of the flow enters a central passage 38 of the shaft 14 through a port 37 in the threaded sleeve 35 wherefrom it passes through the bit and reaches the bottom hole to wash the same and remove the cuttings. The rest of the flow is fed under a pressure equal to the bit differential pressure to the upper mechanical seal 21 of the thrust support 15 of the turbodrill through a passage 39 and grooves 40 in the insert 18 of the radial support 16.

When the turbodrill is set rotating while being suspended in the well, its thrust support is supporting the total dead load of the rotating turbodrill components and the hydraulic load acting on the shaft with the rotors fitted thereto. In the course of drilling, added to these forces acting downwards is a force caused by the axial reaction of the bottom hole acting upwards through the bit. So it is obvious that the thrust support of the turbodrill is subject in the course of drilling either to a downward load if the total dead load of the rotary turbodrill components and the hydraulic load on the shaft and rotors exceeds the force of the bottom hole reaction or to an upward load if said aggregate load is lower than the force of bottom hole reaction.

In spite of the fact that the thrust support disclosed is exposed to a load equal to the difference between the bottom force of the hole reaction and the total load resulting from the dead load of the rotary turbodrill components and the hydraulic load on the shaft and rotors, the thrust load coming on the turbodrill support can be as high as 20 t.

When the thrust support of the turbodrill operates under such high thrust loads combined with drilling speeds of a high order, up to 700 rpm, the ingress of mud containing abrasive particles into the rolling-contact bearing 15 becomes particularly hazardous, inviting rapid wear of the thrust support and failure of the turbodrill. The wear on the mechanical seal and thrust bearings is intensified when the turbodrill operates in conjunction with jet bits because the seal of the thrust support is exposed to the high differential pressure required for effective performance of said bits.

Since in the thrust support of the turbodrill disclosed the rotary discs 28 of the mechanical seal 21 are rigidly attached to the inner races 23 of the multi-row thrust bearing 20, the discs of the mechanical seal are always tightly pressed together irrespective of the direction in which the thrust load may act, i.e., up or down. This feature eliminates the possibility of an ingress of abrasive particles contained in mud into the bearing, safeguarding it from wear and extending its service life.

In the thrust support disclosed, the high hydraulic load characteristic of the jet drilling comes not only from the discs of the mechanical seal rubbing against each other, as this is the case in the known thrust support for a turbodrill, but also, to a certain extent, from the thrust bearing. This prevents the discs from wear and extends the service life of the mechanical seal. Furthermore, in the thrust support of the turbodrill disclosed, some of the thrust load is taken up by the discs of the mechanical seal which are rigidly attached to the races of the thrust bearing so that the bearing is relieved of some of the external thrust load with the result that its service life is extended.

Figure 2:
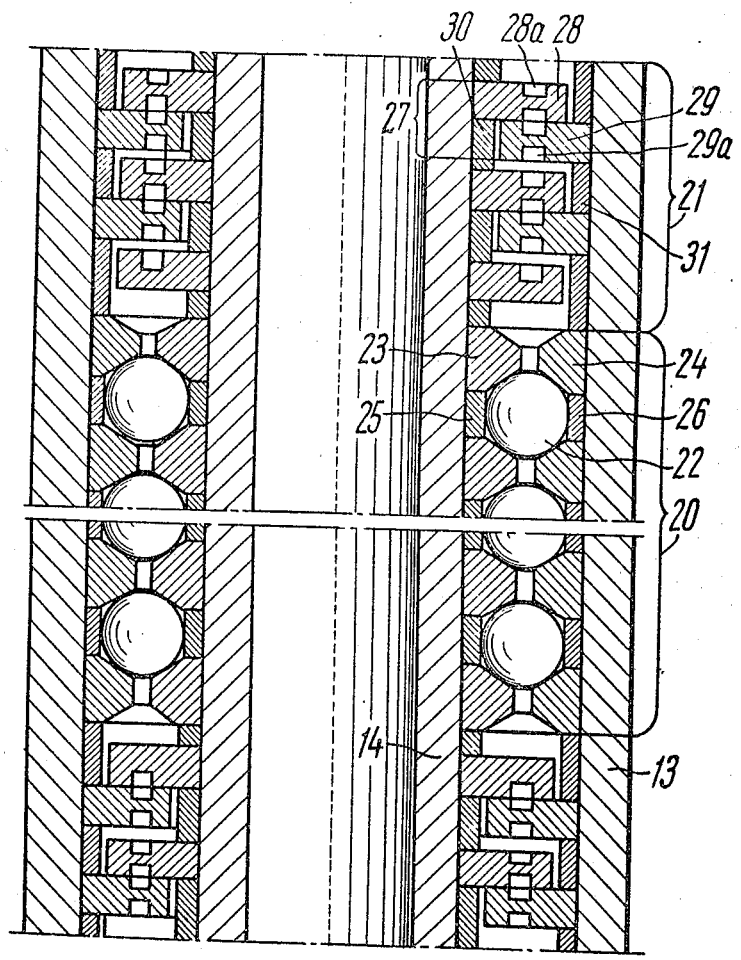
FIG. 2 is a sectional elevation of the thrust support according to the invention.

The multi-row thrust support of the turbodrill is made so that all the inner and outer discs of the multi-row mechanical seal, all the balls and all of the inner and outer races of the multi-row thrust bearing are in contact with each other, this being achieved by manufacturing all the constituent components of the multi-row mechanical seal and of the multi-row rolling-contact thrust bearing accurately to within close tolerances of their axial dimensions. Thanks to that, all the inner discs of the mechanical seal are pressed against the outer discs and all the inner races of the thrust bearing are pressed against the outer races through the intermediary of the balls when the thrust load is directed downwards as indicated in FIGS. 1 and 2. The mud reaching the mechanical seal is incapable of entering the rolling-contact bearing, for its path is blocked by a number of friction packs which are in contact. If the direction of the thrust load is reversed, the reverse surfaces of the discs of the mechanical seals and those of the races of the thrust bearing take over this job, giving the thrust bearing a reliable protection against the ingress of abrasive particles and providing for the distribution of the thrust load between the discs of the mechanical seal and the races of the thrust bearing.

What is claimed is:

1. A thrust support for a fluid motor used in drilling wells, which is fitted onto the shaft of said motor inside its housing, having a rolling-contact thrust bearing, comprising: inner and outer races rigidly attached to said housing and said shaft of the motor, respectively; rolling-contact bodies disposed between said inner and outer races; at least one mechanical seal positioned near said thrust bearing at least at the op end face thereof, and having at least one friction pack consisting of an outer friction disc and an inner friction disc rigidly attached to said outer and inner races of the thrust bearing, respectively, and rigidly attached to said housing and said shaft of the motor, respectively; said arrangement working so that when said fluid motor is set in operation said shaft or housing starts spinning and imparts rotary motion to said inner or outer races of the thrust bearing and the inner or outer friction discs, whereas mud fed under a pressure equal to the bit differential pressure reaches said mechanical seal, but since said rotating races of the thrust bearing are rigidly attached to said rotating discs of the mechanical seal, these components take up the hydraulic and drilling loads jointly with the result that the service life of said thrust support is extended and so is the period of continuous drilling of the well by means of said fluid motor which can successfully operate in conjunction with jet bits.

* * * * *